Figure 5:
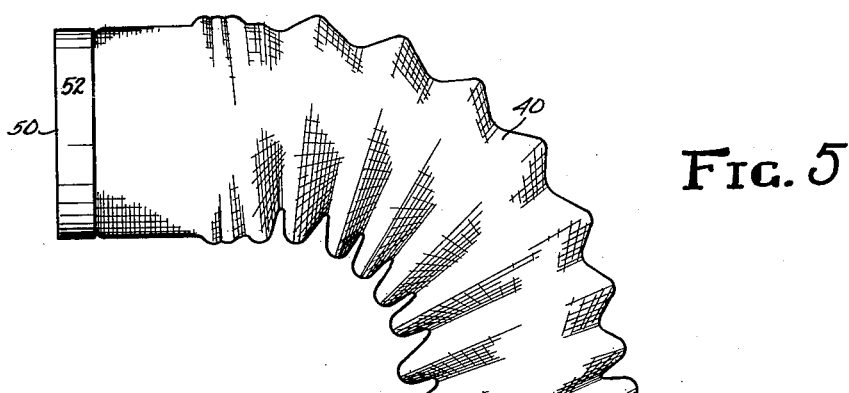

March 5, 1946. F. T. ROBERTS 2,396,059
FLEXIBLE TUBE
Filed April 1, 1943 2 Sheets-Sheet 1
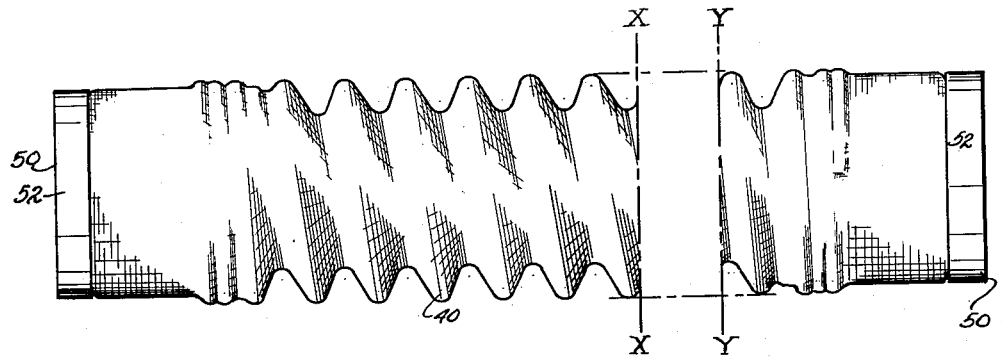
Fig. 1
Fig. 2
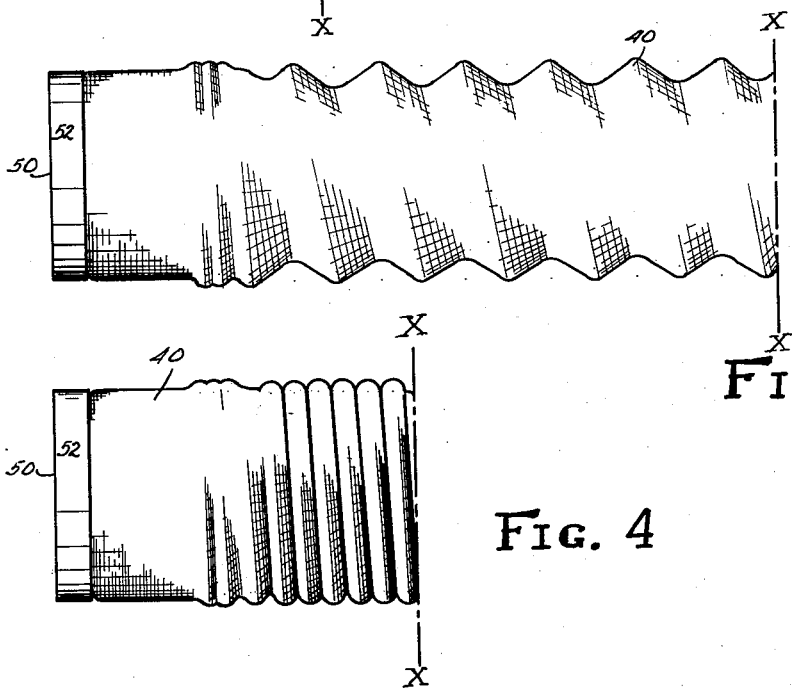
Fig. 3
Fig. 4
INVENTOR.
FRED THOMAS ROBERTS
BY Bates, Teare & McBean
ATTORNEYS.

March 5, 1946. F. T. ROBERTS 2,396,059
FLEXIBLE TUBE
Filed April 1, 1943 2 Sheets-Sheet 2

INVENTOR.
FRED THOMAS ROBERTS
BY *Bates, Teare & McBean*
ATTORNEYS

Patented Mar. 5, 1946

2,396,059

UNITED STATES PATENT OFFICE 2,396,059

FLEXIBLE TUBE

Fred Thomas Roberts, Ridgefield, Conn.

Application April 1, 1943, Serial No. 481,407

5 Claims. (Cl. 138—50)

This invention relates to a flexible tube for various uses, where it is important that the tube be readily flexed without danger of it being collapsed to shut off its passage. My tube is flexible and resilient and may be stretched or compressed axially or bent in any direction. It is thus well adapted for use with gas masks, oxygen helmets, anaesthetizing apparatus, for instance, or with various equipment where a flexible non-collapsible conduit is desired.

An object of the invention is to provide such a tube in a form which, while being efficient in service, may be cheaply constructed and will require only a minimum amount of rubber or similar material and still be impervious either to escape of the contents or infiltration from the outside.

Heretofore it has been customary to make gas mask tubes of internally and externally corrugated high-grade rubber to produce a flexible conduit capable of withstanding continued flexing without premature fatigue, the resilience of the rubber wall being relied upon to maintain the passageway of the tube constantly open notwithstanding its flexing.

It is an object of my invention to provide a flexible resilient tube in which the axial stretchability and compressibility, as well as the flexibility, is not dependent upon the material of the wall of the tube. This wall may be economically made with less critical material or a lower grade of rubber composition. To obtain the desired compressibility and stretchability I provide independent resilient means, which I embed in the wall of a corrugated tube and which is capable of returning the tube to its normal condition, after being stretched or compressed or flexed and then released, without reliance for resiliency on the material forming the wall of the tube.

More particularly, my invention provides a helically corrugated tube of impervious material retained in its corrugated condition by an embedded helical spring and thus readily flexible in any direction.

I accomplish the desired result preferably by providing an inner tubular sleeve of flexible impervious material embraced by a helical spring, the material of said sleeve being internally corrugated between successive turns of the spring and the spring lying at the crest of the outward corrugations. The spring is stretched from its normal condition, but not to its elastic limit, and is suitably bound to the internal sleeve by a proper covering, the regions between the turns of the spring being pressed inwardly. There thus results an internally and externally corrugated tube with a stiffening member in the form of a spring embedded within it adjacent the crests of the outer corrugations.

The embedded spring, being stretched only part way to its limit, is readily collapsible and extendable and flexible in any direction, and such movements are allowed to the tube wall by reason of its corrugations. Accordingly, I avoid reliance on rubber as the medium to retain the tube in shape or allow its flexing and need only employ sufficient rubber to make an impervious wall.

Figure 6:
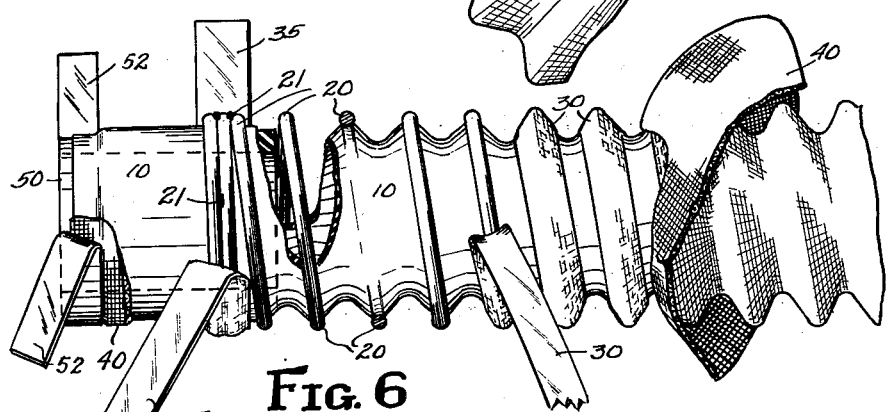
Figure 8:
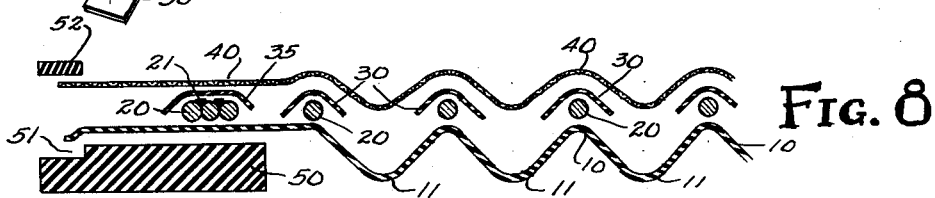
Figures 7, 9:
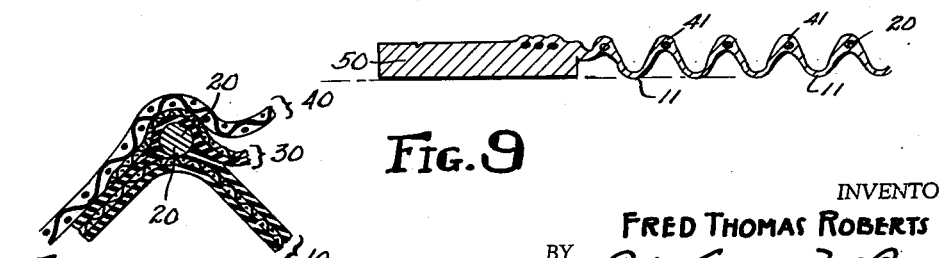

In the drawings, illustrating a preferred embodiment of my invention; Fig. 1 is a side elevation of my tube with an intermediate portion thereof broken out, as indicated by the broken lines X—X and Y—Y; Fig. 2 is a view of the reinforcing helical spring employed in the tube, this view indicating the normal or unapplied condition of the spring; Fig. 3 is a view of a portion of the tube of Fig. 1, stretched from the position shown in that figure; Fig. 4 is a view of the same portion of the tube collapsed to the limit. The total length of the parts shown in Figs. 2, 3 and 4, correspond to the distance from the left hand end of the tube to the line X—X in Fig. 1; Fig. 5 is a view of a portion of my tube illustrating its readily flexible condition; Fig. 6 is a side elevation of a portion of my tube stripped apart to disclose its various components; Fig. 7 is an enlarged fragmentary longitudinal cross section through the crest of one of the outward corrugations; Fig. 8 is a diagram illustrating a longitudinal section through the tube with the various portions separated; Fig. 9 is a diagram illustrating the finished tube.

My tube, as shown best in Figs. 6 and 8, preferably comprises an inner tubular sleeve 10 of flexible material, a stretched helical spring 20 embracing the same; a spiral winding of adhering tape 30 about the exterior of the spring, and a sleeve of fabric 40 outside of the tape, the wall being inwardly diverted in a helical course between successive spring turns. Preferably, I employ rubber bushings 50 at the opposite ends of the tube, which may have smooth bores for attachment to the conduits with which the tube is to be used.

As a matter of economy and to reduce to the minimum the amount of rubber employed, I prefer to make the inner sleeve of rubberized fabric; the spring, of steel wire; the tape of fabric cut on the bias and having a facing of rubber, and the sheath of stockinet. When rubber is available and not expensive, one may employ a thin rubber tube as the inner sleeve, and a strip of rubber could be employed as the binding tape about the spring, and the spring itself might be of hard rubber or suitable plastic material.

The inner member 10 of my composite tube, preferably a sleeve of rubberized fabric, extends across the two end bushings, as indicated in Fig. 8. The spring 20, when manufactured, may have its coils snugly against each other, as shown in Fig. 2. The end-most coil or coils of this spring surround the flexible sleeve 10 where it surrounds the inner end of the bushing 50, such coils being preferably welded together, as indicated at 21 in Fig. 6. Surmounting the attached endmost coils of the spring is a strip of tape 35 wound in cylindrical form over the outside of the attached coils effectively binding them to the inner sleeve 10 and bushing 50.

The anchored spring is then stretched materially beyond its normal closed condition, but well within its maximum permissible extension, so that its successive coils are well spaced, as shown in Fig. 6, and the other end of the spring is then attached to the bushing 50 at the opposite end in a similar manner to that indicated in Fig. 8, this bushing being meanwhile held spaced from the bushing shown in that figure.

About the successive turns of the extended spring 20, I wind a strip of tape 30 either of rubber or of fabric rubberized throughout or having a coating of rubber on its inner face. This tape surmounts the spring and at its edges is pressed down and caused to adhere to the inner tube 10.

Surrounding the parts above mentioned is the sheath 40 preferably of stockinet, which is drawn over the base tube, the spring and spiral tape described. This stockinet extends over the bushing and is secured to it. Preferably this sheath passes over a rabbeted portion 51 at the outer end of the bushing and is bound down in place by external rubber ring 52 subsequently vulcanized to the sheath and bushing.

In the formation of the tube, after the stretched spring is applied to the exterior of the foundation tube 10 and the tape supplied to the spring, and the exterior tubular sheath applied, I force inwardly the regions between the successive turns of spiral tape, thus producing inner corrugations indicated at 11 and outer corrugations beyond the wires as indicated at 41. Preferably I make the inner member 10 as a cylindrical tube and partially vulcanize it, then I apply the stretched spring to the exterior thereof, then surmount it with the spiral tape, pressing the edges of the tape well down into engagement with the inner tube, intermediate cement being employed. I then apply a coating of cement on the exterior of the tube so far constructed and draw over it the sheath of stockinet. I then press down the composite tubular wall between the edges of successive turns of tape to make the inner corrugations 11.

After the bushings in partially vulcanized condition are applied, the entire construction is vulcanized as a unit, thus completing the partial vulcanization of the inner tube, the tapes, and the bushings, and binding the entire construction into a unitary tube corrugated internally and externally, as indicated in Fig. 9.

The inward pressing of the rubber faced tapes 30 causes them to snugly embrace the wire turns 20 and adhere to the inner fabric tube to mount the wire substantially in a mass of rubber. Fig. 7, which is greatly exaggerated for clearness of illustration, indicates at 10 the woven rubberized fabric which constitutes the inner tube; at 30 the rubber lined tape which embraces the wire 20 and snugly engages the outer face of the rubberized tube 10, and, finally, at 40 the stockinet sleeve lying outside of the tape but, as already explained, pressed downwardly between successive tape turns into close engagement with the inner tube.

Each turn of the wire helix is in effect embedded in rubber, and thus the final construction after vulcanization presents a unitary member comprising end bushings and a rubberized wall corrugated internally and externally and reinforced at the crest of the external corrugations by the embedded stretched spring. This spring being stretched, for example, to two or three times its normal length is still well within its elastic limit of stretching so that the finished tube may be either extended axially, as indicated in Fig. 3, or collapsed axially, as indicated in Fig. 4, or flexed in any direction with consequent collapsing on one side and extension on the other, as indicated in Fig. 5—and all of this without the possibility of collapsing the tube.

It will be seen that my tube relies on the wire spring to insure its non-collapsibility while allowing maximum flexibility, condensation and expansion, and thus avoids the necessity of heavy rubber corrugations. It is only necessary to provide sufficient rubber to make the interior tube impervious and to cause the tapes to adhere and enable the entire corrugated tube to be vulcanized on suitable bushings for attachment to whatever conduits are desired. Thus my tube may be rapidly manufactured at comparatively small expense.

While I prefer to use the helically applied adhering tape as the immediate binder for the spring turns, I may, in making tubes for some purposes, further economize by omitting the spiral winding of tape, relying on the stockinet and the intermediate layer of cement as the binder holding the spring in place.

I claim:

1. A flexible tube comprising an internal tube of flexible material, a helical winding of a stretched wire spring on the exterior thereof, a helical winding of tape on the exterior of the wire binding it in the stretched condition to the internal tube, said internal tube being externally corrugated at the wire and tape and internally corrugated between adjacent turns of the wire, and a bushing within the endmost portion of said internal tube, the endmost turns of the wire embracing both the internal tube and the bushing within it.

2. A flexible tube comprising a comparatively thin impervious body helically corrugated internally and externally, a helical spring embedded within the external corrugation and a comparatively thick-walled rubber bushing mounted within and united to the end portion of the tube and embraced by the end portion of the stiffening means.

3. A flexible tube comprising an elastic internal tubular member, a helical spring applied under axial tension on the exterior of said member, a second elastic member applied outside of the spring, said two members being secured together between the convolutions of the spring, whereby the tube shortens when the tension on the spring is relieved but retains the property of stretchability.

4. A flexible tube comprising an elastic flexible impervious internal tubular member, another elastic tubular member surrounding the first-mentioned member, and a helical spring interposed between said members and under tension axially of the helix, said spring acting to maintain the tube in a shortened condition while allowing it to be freely extended and flexed.

5. A flexible tube comprising an elastic tubular member corrugated internally and externally, a helical spring, maintained under tension axially of the helix and embedded in the outer crests of the corrugations, the valleys between such crests being free to increase in diameter when the tube is elongated, and a second elastic member outside of the spring, said two members being secured together between the convolutions of the spring.

FRED THOMAS ROBERTS.